No. 791,836. PATENTED JUNE 6, 1905.
A. SUNDH & A. MAGNUSON.
ELECTRIC TRAIN CONTROL SYSTEM.
APPLICATION FILED FEB. 16, 1905.
3 SHEETS—SHEET 1.
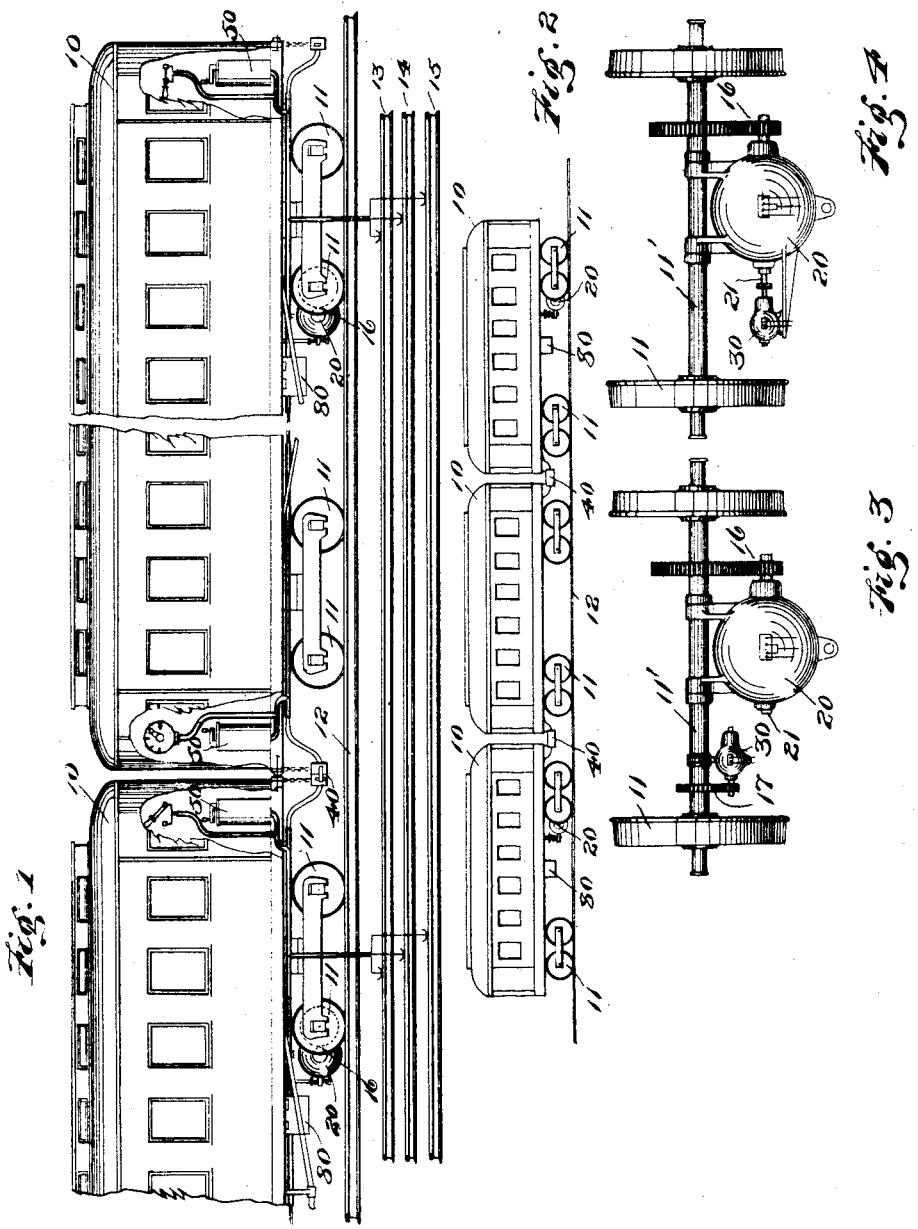

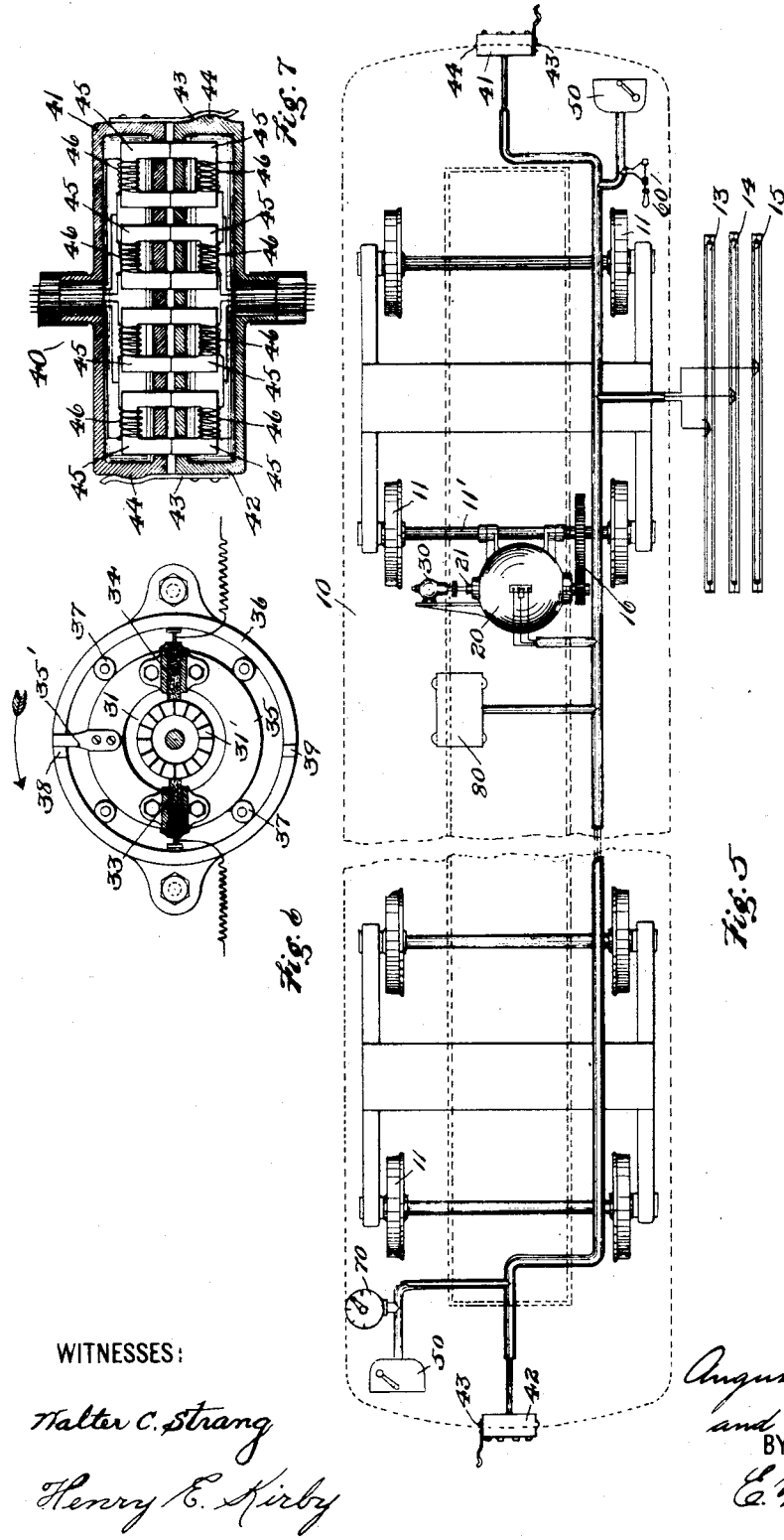

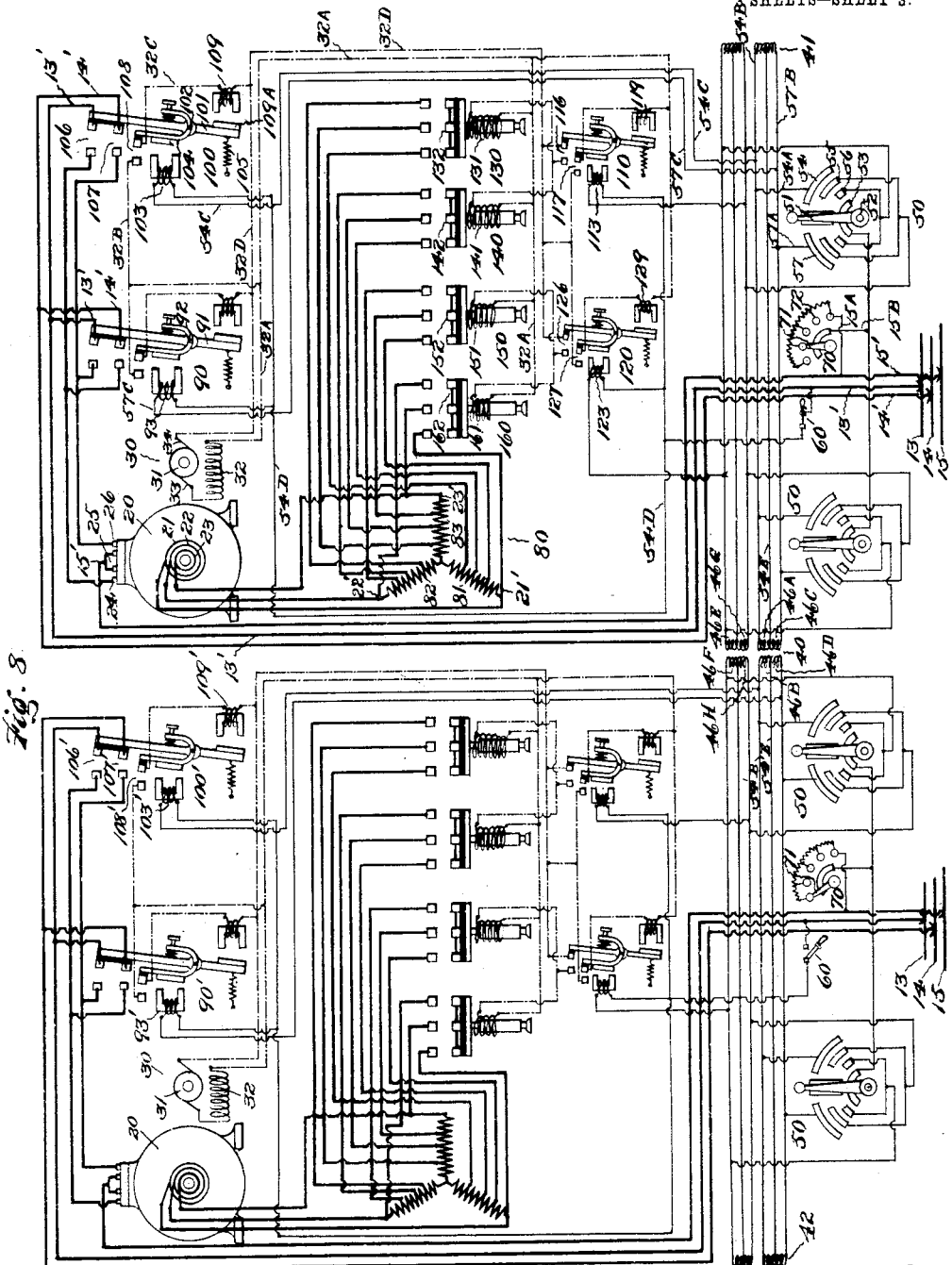

No. 791,836. Patented June 6, 1905.

UNITED STATES PATENT OFFICE.

AUGUST SUNDH, OF YONKERS, AND AXEL MAGNUSON, OF NEW YORK, N. Y.

ELECTRIC TRAIN-CONTROL SYSTEM.

SPECIFICATION forming part of Letters Patent No. 791,836, dated June 6, 1905.

Application filed February 16, 1905. Serial No. 245,868.

*To all whom it may concern:*

Be it known that we, AUGUST SUNDH, residing at Yonkers, in the county of Westchester, and AXEL MAGNUSON, residing at New York city, in the county of New York, State of New York, citizens of the United States, have invented new and useful Improvements in Electric Train-Control Systems, of which the following is a specification.

Our invention relates to an improved system of electric train control, and more especially to such trains as have motors on more than one of the cars and are propelled by alternating currents.

We will describe our invention in the following specification and point out the novel features thereof in claims.

Like characters of reference designate corresponding parts in all of the drawings, in which—

Figure 1 is a side elevation of parts of two railway-cars, showing our invention applied thereto. Fig. 2 is a diagrammatic view of two railway-cars having electric motors and a third idle car or "trailer" between them and shows our invention applied to them. Figs. 3 and 4 are details showing two methods of mechanically connecting the driving-motors and other apparatus which we use in carrying out our invention. Fig. 5 is a plan view of parts of a car, showing how the various apparatus may be arranged on the car. Fig. 6 is an end view of a detail of a part of an electric generator such as we use in connection with the rest of our apparatus. Fig. 7 is a sectional view of a special transformer or inductive apparatus. Fig. 8 is a wiring diagram which shows a preferred system of electrical connections for the apparatus on two cars.

10 designates a railway-car, of which the wheels 11 run upon a rail 12.

13, 14, and 15 designate power-rails which are adapted to carry an alternating current from a suitable source of power to the cars of a train.

20 designates an alternating-current motor which is connected to the journals 11' of the car-wheels, preferably by suitable gearing 16, and arranged to drive the car upon which it is mounted.

30 is a magneto or dynamo which is adapted to generate a direct current of electricity. It is connected to the wheels or some other moving part of the car. In Fig. 3 it is shown connected to the journal 11' by gearing 17, while in Figs. 4 and 5 it is shown directly connected to the shaft 21 of the motor 20. 31 designates the armature of this generator, and 32 its field.

In Fig. 6 we show an end view of a part of the generator to show an arrangement for holding its brushes 33 and 34 and for automatically shifting them when the direction of rotation of the armature is changed, so that its generated current will always flow in one direction. The brushes are mounted in a circular yoke 35, which is rotatably supported in a casing 36 by antifriction-rollers 37. The yoke 35 has projecting from it an arm 35', which is adapted to engage with projecting lugs 38 39 on the casing 36 and to thereby limit the movement of the yoke. If the armature 31 is rotated in an anti-clockwise direction, as indicated in the drawings by the arrow, the arm 35' will engage with the lug 38 and the brushes 33 and 34 will be held in the position shown in the drawings; but if the armature 31 is rotated in a clockwise direction the friction of the brushes on the commutator 31' will carry them and the yoke around until the arm 35' engages the lug 39', when the position of the brushes 33 and 34 will be interchanged.

40 designates a special inductive apparatus which is used to induce alternating currents from one car to another of a train. The sectional view of this apparatus in Fig. 7 shows it somewhat in detail. It comprises two similar parts 41 and 42, which are adapted to be fitted together, as shown. One side of each of these parts may be fitted with a spring 43, which is adapted to engage with a projection 44 on the other part, 41, or other suitable means may be provided to hold the two parts together. One of these parts is provided on the end of a car, and the other of these parts is provided on the adjacent end of the adjoining car of a train. They are preferably supported yieldingly, as shown in Fig. 1. If the cars become separated, the two parts of the inductive apparatus are pulled apart and it immediately becomes inoperative. Each part is provided with a series of cores 45 45 45 45, of magnetic material, preferably of laminated soft iron, and upon each of these cores are windings of electrical conductors 46 46 46 46. The cores are so arranged that when the two parts of the inductive apparatus are put together each core in one part abuts the opposite core in the other part, so that each part of cores forms one continuous loop or magnetic path upon which are two similar windings. When an alternating current is sent through one of these windings, a current will be induced in the other winding on the same magnetic path in a well-known manner. The cores 45 45 are inclosed by the casings of the two parts 41 and 42 and only their ends project. This is a preferred construction, as the apparatus may thus be made waterproof.

Upon each platform of the motor-cars a master-switch or controlling-switch 50 may be placed. These may be connected to the various other parts of the apparatus in the manner which will be hereinafter set forth in the description of the wiring diagrams, Fig. 8. The wiring between the various parts of the apparatus is preferably inclosed in tubing or conduit, as shown in Figs. 1 and 5.

A cut-out switch 60 is provided on each car for the purpose of operatively connecting or disconnecting the controlling-switches on the different cars. 70 designates a compensating switch, one or more of which are also provided on each car, the purpose of which will be pointed out later. While we have shown but one cut-out switch 60 and one compensating switch 70 on each car, we generally prefer to place one of each of these switches on each car-platform, so that the entire control system can be controlled from any one selected platform.

80 designates an electric controller which is adapted to contain various resistances, switches, &c., which we will now describe in connection with the various electric circuits which we will use in carrying out our invention.

We will now refer to Fig. 8 and point out the electrical connections and describe the operation of our invention. As this figure shows the complete wiring for two cars which are substantially alike, we will refer first to only that portion of the drawings which is on the upper portion of Sheet 3 of that half of the diagram which is shown on the right-hand side of the sheet when the latter is viewed in the way to show the reference-figures in upright position. The main motor-circuits are designated by heavy lines, the operating-circuits are designated by light lines, and the direct-current circuits are designated by broken lines of dots and dashes.

It will be seen that the conductor 15' from the power-rail 15 is connected by a conductor $15^A$ to the resistance 72 of the compensating switch 70. The circuit continues through this resistance, the switch-arm 71, and conductor $15^B$ to a stationary segmental contact 53, which is on the master-switch 50 and is always in electrical connection with the latter's movable switch-arm, which is pivoted at 52. Now if this arm 51 is moved to the right until it is brought into engagement with the stationary contact 54 a circuit is thereby established from the main 15' to the main 13', through a magnet 103 on a starting-switch 100, through the conductors $54^A$, $54^B$, $54^C$, and $54^D$, and cut-out switch 60, which is shown in its closed position. The effect of this will be to energize the magnet 103. It will attract its armature 104 and its connected parts, and thus cause the pivoted arm 101 to be moved over against the action of the spring 105 until its movable contacts are brought against stationary contacts and close electrical circuits at 106, 107, and 108. The contacts at 106 and 107 will connect the mains 13' and 14' to the motor 20 at 24 and 26, respectively. As the other main, 15', is permanently connected to the motor at 25, the motor will now be connected to the mains and will begin to rotate in one direction. Now as the generator 30 is connected to run with the motor 20 it will also be rotated and will generate a direct current. This direct current will pass through the generator's armature 31, fields 32, conductors $32^A$ and $32^B$, contacts 108, conductor $32^C$, magnet 109, and conductor $32^D$ back to the generator. The magnet 109 will thus be energized and attract its armature $109^A$, which is on the pivoted arm, 101, and will hold the arm firmly over in position to close the contacts at 106 107 108. It will then assist the magnet 103 in holding the arm 101 in closed position. As magnet 103 is connected across one of the phases of an alternating current, its pull will be a pulsating one; but the steady pull of the direct-current magnet 109 will hold the arm 101 over firmly and destroy all tendency of the latter to chatter. We have now shown that the main 15' has been connected to the conductor $54^B$. This conductor $54^B$ is connected to the upper terminal of winding $46^A$ on the inductive apparatus 40, and the other terminal of winding $46^A$ is connected to the main 13' by a conductor $54^E$ and through the cut-out switch 60. An alternating current therefore passes through this winding $46^A$, and, as is well known, this will cause a similar alternating current to be set up or induced in its companion coil $46^B$. On the second car are two conductors $54'^B$ and $54'^E$, corresponding with the conductors $54^B$ and $54^E$ on the first car, and these conductors are connected with a similar system of wiring to that above described, and the current induced in winding $46^B$ will energize the magnet 103' of starting-switch 100' and cause the latter to close contacts at 106′ and 107′, which will connect the motor 20 on the second car to the mains and contacts at 108′, which will close a circuit through the direct-current magnet 109′. The motor 20 on the second car is thus connected to rotate in the same direction as the motor 20 on the first car. As the cut-out switch 60 on this second car is opened it will be noticed that the operating-circuits on this second car are entirely independent of the main motor-circuits. If the operator had turned the pivoted arm 51 to the left instead of to the right until it had engaged with the stationary contact 57, the operation would have been similar, except that in this case the starting-switch 90 would have been actuated by its magnet 93 and would have closed the mains 13′ and 14′, respectively, to the terminals 26 and 24 on the motor 20, and the latter would rotate in the opposite direction. Also in this case the current would pass through the winding 46$^C$ and induce a current in the winding 46$^D$ of the inductive apparatus 40, and as this winding 46$^D$ is connected to magnet 93′ of starting-switch 90′ the latter would be closed and the motor 20 on the second car would also rotate in the opposite direction, or the direction corresponding to that of the motor 20 on the first car.

Before proceeding further with the description of the operation of this system we will point out the purpose and function of the compensating switch 70. It will be noted that the resistance 72 connected with this switch is divided into a number of sections, in this case four, and is connected to a number of stationary contacts over which the pivoted arm 71 may be moved. In the compensating switch 70 on the right-hand part of the diagram which we have been describing three of these four sections of resistance 72 are included in the circuit by the position of the arm 71. This is to limit the amount of current which may pass from the mains through the operating-circuits. This is because two cars are to be operated from the one master-switch, as shown in the diagram. If but one car were to be operated, less current would be required and all of the resistance 72 would be included. If more cars were to be operated, more current would be required and less resistance would be included. As many steps of resistance may be provided as the maximum number, less one, of cars to be operated from one master-switch. This compensating switch is not an absolute necessity; but its use makes the operation more uniform when the number of cars in the train is varied.

To return now to the operation of the motor, we will point out that an opposition element in the form of a star-connected resistance 80 is connected in series with the rotor of the motor 20. The three collector-rings 21, 22, and 23 are connected, respectively, to the outer terminals 21′, 22′, and 23′ of this resistance. As long as this resistance remains connected in the rotor-circuit the motor will run slowly under usual conditions. We have, however, provided means for automatically short-circuiting this starting resistance in a series of steps and allowing the motor to accelerate gradually at the proper rate. If the operator desires to allow the train to speed up, he will not stop the switch-arm 51 as soon as it comes into engagement with either the contact 54 or 57, but will throw it over to its extreme position on one side or the other. Let us say that he moves it to the right until it engages with the stationary contacts 54, 55, and 56. This will cause the speed-controlling switches 110 and 120 to be closed by closing circuits through, and thereby energizing, their alternating-current magnets 113 and 123. These speed-controlling switches are similar in construction and in operation to the starting-switches 90 and 100, above described, and when closed will themselves close circuits through their direct-current magnets 119 and 129 at the contacts 117 and 127, which magnets will be fed by the current from the generator 30 and will hold the switches firmly closed, so that they will not chatter, as has already been fully described. These speed-controlling switches will also close other contacts at 116 and 117, which will include the accelerating-magnets 130, 140, 150, and 160, in circuit with the direct-current generator 20. The two main leads from the direct-current generator are designated by 32$^A$ and 32$^D$. 32$^A$ is connected to the lower terminal of each of the windings 131, 141, 151, and 161 of the accelerating-magnets. When the speed-controlling switch 110 is closed, it connects, through its contacts at 116, the upper terminals of the windings 131 and 141 to the other lead, 32$^D$. When the speed-controlling switch 120 is closed, it connects, through its contacts at 126, the upper terminals of the other windings, 151 and 161, to the lead 32$^D$, so that when both of the speed-controlling magnets 110 and 120 are closed the windings of all four of the accelerating-magnets 130, 140, 150, and 160 will be connected in parallel with the direct-current generator.

When the motor 20 starts up, the voltage generated by the direct-current generator 30 will increase in proportion to the speed of the motor. The current which it generates will energize the accelerating-magnets, and they will raise their cores, with their connected parts. These accelerating-magnets are preferably adjusted to act one at a time as the speed of the motor 20 becomes greater and the voltage of the generator 30 increases. This may be accomplished in many ways. In the diagram we have shown the winding 131 of magnet 130 with a greater number of turns than the other magnets. 141 has more turns than the other two magnets, and 151 has more turns than has 161. These coils should be wound to have approximately the same resistance. Now as the generated voltage gradually increases in strength the magnet 130 will first become energized sufficiently to raise its core, with its connected parts. A further rise of voltage will cause magnet 140 to raise its core, then 150 to raise its core, and finally 160 will raise its core. Each of these magnets has attached to it, but insulated from its core, a bridging-piece 132, 142, 152, and 162. These are adapted to be brought into electrical connection with and to short-circuit a series of stationary contacts directly above them, which contacts are electrically connected to various points along the three arms 81, 82, and 83 of the starting resistance 80. On account of these connections and the step-by-step operation of the accelerating-magnets the starting resistance will be gradually cut out in direct proportion to the acceleration of the motor. As the action of the accelerating-magnets takes place in proportion to the variable voltage generated by the generator 30 and as this latter is connected to run with the motor and its voltage is consequently proportional to the speed of the car, it is evident that their action will be more or less rapid, according to varying conditions of load and track. Therefore if the motors are called upon to do heavy work their starting resistances will be cut out slowly, while if they are doing but little work their resistances will be cut out rapidly and they will attain full speed quickly.

We have shown the opposition element 80 as a starting resistance. It may be resistance or inductance or any other desired arrangement which will prevent too great a flow of current on starting or otherwise cause the motor to accelerate gradually.

When the above-described operation has taken place—that is, when the master-switch arm 51 has been moved to full-on position—both of the windings $46^E$ and $46^G$ of the inductive apparatus will be energized and a pulsating current will pass through them in the manner and for the reason previously described. This will induce similar currents in the windings $46^F$ and $46^H$, and these through their connections with the circuits on the second car will cause the apparatus on the second car to operate and short-circuit the motor-starting resistance in a manner similar to that already described.

We have described the operation of our system for slow running with all the resistance in the rotor-circuits of the motors and also the operation whereby the train is brought up to full speed automatically. If the operator had desired to have the train attain an intermediate speed, he would have moved the switch-lever 51 over until it engaged only the contacts 54 and 55, in which the speed-controlling switch 110 would have been closed by its magnet 113 being energized; but the speed-controlling switch 120 would remain open. In this way only the accelerating-magnets 130 and 140 would have been connected to the direct-current generator and but half of the starting resistance could be short-circuited as the motor and car accelerated. The other half remains in the rotor-circuit and prevents the motor getting its full power. Only the winding $46^G$ of the inductive device will then get current, and the current it induces in its companion winding $46^H$ will cause the operation on the second car to be similar to that on the first.

It is evident that the reverse operation to that already described may be obtained by moving the switch-arm 51 back toward its central position—that is, the resistance 80 may be inserted in the rotor-circuit or the line-current cut off from the motors at will.

If the switch-arm 51 had been moved over to its extreme right position, so that all the resistance had been cut out of the rotor-circuit, and is now moved back until it runs off of the stationary contact 56, this will break the circuit in the winding 123 of the speed-controlling magnet 120. It will thereupon release its armature and at 127 will break the circuit through its direct-current magnet 129, whereupon the circuit through the accelerating-magnets 150 and 160 will be broken at 126. Similarly, if the switch-arm 51 is moved back off of contact 55 the speed-controlling magnet 110 will break the circuit to the accelerating-magnets 130 and 140 at 116, and as these accelerating-magnets will thereby become deënergized they will allow their cores to drop and will reinsert the starting resistance in the rotor-circuit. A further movement of the switch-arm 51 will move it off of contact 54, whereupon the starting-switch 100 will be opened and will cut off all current from the motor.

We will call attention at this point to the special construction of the starting-switches and the speed-controlling switches. It will be seen that the alternating-current magnets of these switches will pull over toward them the various arms which carry the movable electric contacts and that the direct-current magnets of these switches will tend to hold the main part of these switches firmly in their closed position; but when the alternating current is cut off from the magnets the part which carries their armatures will be moved back independently of the main arm and in doing so will break the circuit to the direct-current magnets, which will allow the main arms themselves to be moved back until all of their electrical contacts are opened.

Each motor-car has complete equipment including both the controlled and controlling circuits. As many such cars may be connected together as desired, and a train thus composed may be controlled from any selected platform. If it is desired to use idle cars or trailers in a train, it is only necessary that such cars be supplied with the inductive apparatus 40, such as that on the motor-cars, and the two parts of the inductive apparatus at the opposite ends of the cars may be connected by suitable electrical conductors. Fig. 2 shows such a car connected between two motor-cars.

This system of train control has many advantages. There are no train-wires to be connected between the cars with the attendant opportunities for costly mistakes and danger in handling. The two parts of the inductive apparatus between the two cars may be easily and quickly joined together, and yet they will easily part if the cars become separated for any reason, and so will automatically shut off the power from the motors in case of an accident of this kind. The operating-switches, which are actuated by alternating-current magnets, are firmly held in place by direct-current magnets, thus preventing chattering and insuring good contacts at the switches and positive control of them. The accelerating-magnets are of the direct-current type. The acceleration of the motors and of the train will be easy and gradual and is entirely automatic and cannot be interfered with by the carelessness of the operator. This fact is a protection to the motors and the other apparatus. At the same time the train is under the control of the operator, and he may make it run slow or fast in either direction or stop it at will. From any selected point on the train all the motors may be simultaneously controlled.

Our invention is broadly new in many particulars, and we do not mean to limit ourselves to the particular devices and arrangements shown, as they are merely illustrative of the invention.

While we have described this invention in connection with alternating currents, it is obvious that it is also applicable to pulsating or intermittent currents.

What we claim is—

1. In combination with two connected cars, adapted to carry goods or passengers, electrical circuits on the cars, an inductive apparatus associating the circuits on the two cars, and a chain for flexibly supporting the inductive apparatus.

2. In combination with two cars, a two-part inductive apparatus, one part of which is flexibly connected to one of the cars by means of a chain and the other part of which is flexibly connected to the other of the cars by means of another chain.

3. In combination with two cars, a two-part inductive apparatus, one part of which is on one of the cars and the other part of which is on the other of the cars, and means for uniting and rigidly holding the two parts together.

4. In combination with two cars, a two-part inductive apparatus, one part of which is on one of the cars and the other part of which is on the other of the cars, and means for uniting and rigidly holding together the two parts under usual conditions but allowing them to be pulled apart when subjected to an undue strain.

5. In combination with two cars, an inductive apparatus comprising two parts, each inclosed in a waterproof casing, one of which parts is supported by one of the cars and the other of which is supported by the other of the cars.

6. In combination with a plurality of cars, a plurality of alternating-current circuits on each of the cars, a plurality of inductive devices between the cars adapted to operatively associate the circuits, and a switch arranged to control said circuits.

7. In combination with a plurality of cars, a plurality of alternating-current circuits on each of the cars, a plurality of inductive devices between the cars adapted to operatively associate the circuits, and switches on each car for controlling the circuits.

8. In combination with a plurality of cars, a plurality of alternating-current circuits on each of the cars, a plurality of inductive devices between the cars adapted to operatively associate the circuits, and switches on each car, any one of which may be used for controlling the circuits.

9. In combination with a plurality of connected cars, a plurality of alternating-current circuits on each of the cars, a plurality of inductive devices between the cars adapted to operatively associate the circuits and arranged to render such circuits inoperative should the cars become separated.

10. The combination with a plurality of cars of a motor and a controlling-circuit therefor on each car and inductive means for operatively associating the controlling-circuits.

11. The combination with a plurality of cars of a motor and a controlling-circuit therefor on some of the cars, and inductive means for operatively associating the controlling-circuits.

12. The combination with a plurality of cars, of motors and controlling-circuits therefor, inductive means for operatively associating the circuits between the cars and a switch in the controlling-circuit.

13. The combination with a plurality of cars, of a motor and a controlling-circuit therefor on each car, inductive means for operatively associating the controlling-circuits and a switch on each car in the controlling-circuit.

14. The combination with a plurality of cars, of a motor and a controlling-circuit therefor on each car, inductive means for operatively associating the controlling-circuits, and means for controlling the motors from any selected car.

15. The combination with a plurality of cars, of a motor and a controlling-circuit therefor on each car, inductive means for operatively associating the controlling-circuits, and means for controlling the motor from any selected car whereby the motor may be started in either direction.

16. The combination with a plurality of cars, of motors and controlling-circuits on the cars, inductive means for associating the controlling-circuits between the cars, master-switches at both ends of each car, and means for operatively associating the master-switches with the controlling-circuits.

17. The combination with a plurality of cars, of motors and controlling-circuits on the cars, means for inductively associating the circuits between the cars, master-switches on the cars, connected in the controlling-circuits, and means for rendering any desired master switch or switches inoperative.

18. The combination with a plurality of cars of a motor and a controlling-circuit therefor on each car, inductive means for operatively associating the controlling-circuits, a master-switch and a compensating switch on each car for controlling the circuits.

19. The combination with a plurality of cars of a motor and a controlling-circuit therefor on each car, inductive means for operatively associating the controlling-circuits, a master-switch on each car for controlling the circuits, and a compensating switch for varying the current in the controlling-circuits.

20. The combination with a plurality of cars, of a motor and a controlling-circuit therefor on each car, inductive means for operatively associating the controlling-circuits, a master-switch on each car for automatically controlling the circuits, and a compensating switch for varying the current in the controlling-circuits in proportion to the number of cars.

21. The combination with a plurality of cars, of a source of alternating-current supply, alternating-current motors, circuits adapted to connect the motors to the source of supply and controlling-circuits therefor on each car, and inductive means for operatively associating the controlling-circuits between the cars.

22. In combination with a plurality of cars, motors on some of the cars, an external source of alternating-current electrical supply connected to one of the cars, and inductive devices between the cars arranged to establish current in the other cars.

23. The combination with a plurality of cars of a motor and a controlling-circuit therefor on each car, and inductive means for associating the circuits so that they will be mutually operative when the cars are together.

24. The combination with a plurality of cars, of a motor and a controlling-circuit therefor on each car, and inductive means on the end of each car for associating the circuits so that they will be mutually operative only when the cars are together.

25. In combination with an electric train, controlling-circuits therefor adapted to carry a single-phase alternating current, a master-switch for controlling the circuits, and means for regulating the amount of current in the circuits.

26. In combination with an electric train, motors for driving the train, controlling-circuits for the motors, said circuits adapted to carry a single-phase alternating current, and a master-switch for controlling the controlling-circuits.

27. In combination with an electric train, motors for driving the train, controlling-circuits for the motors, said circuits adapted to carry a single-phase alternating current, a master-switch for controlling the controlling-circuits, and means for regulating the amount of current in the circuits.

28. In combination with an electric train, a source of multiphase alternating-current supply, multiphase motors for hauling the train, and single-phase controlling-circuits for the motors.

29. In combination with a plurality of cars, a source of multiphase alternating-current supply, multiphase motors for hauling the cars, single-phase controlling-circuits for the motors, and means for controlling the circuits from any selected car.

30. In combination with an electric train, a source of multiphase alternating-current supply, multiphase motors for hauling the train, single-phase controlling-circuits for the motors, and means for inductively associating the controlling-circuits between the cars of the train.

31. In combination with a plurality of cars, a source of multiphase alternating-current supply, multiphase motors for hauling the cars, single-phase controlling-circuits for the motors, means for inductively associating the controlling-circuits between the cars of the train, and means for controlling the circuits from any selected car.

32. In combination with an electric train, alternating-current motors thereon, controlling devices for the motors, said controlling devices being actuated by a single-phase alternating current controlled from any selected platform of the train.

33. In combination with an electric train, multiphase alternating-current motors thereon, electrically-operated controlling devices for the motors, single-phase controlling-circuits for actuating the controlling devices, and means for inductively associating the controlling-circuits between the cars.

34. In combination with an electric train, multiphase alternating-current motors thereon, electrically-operated controlling devices for the motors, single-phase controlling-circuits for actuating the controlling devices, means for inductively associating the controlling-circuits between the cars, and means for controlling the controlling-circuits from a selected platform of the train.

35. The combination with a car having an electric motor, a plurality of controlling-circuits therefor and a switch arranged to send a single-phase alternating current through one or more of the controlling-circuits, of another car also having an electric motor and a plurality of similar controlling-circuits, and an inductive device between the cars arranged to send a single-phase current through such of the circuits on the second car as correspond to the circuits of the first car through which current is being sent.

36. The combination with a car having an electric motor, a plurality of controlling-circuits therefor and a switch arranged to send a single-phase alternating current through one or more of the controlling-circuits, of one or more cars each having an electric motor and a plurality of similar controlling-circuits, and inductive devices between the cars arranged to send a single-phase current through such of the circuits on the other cars as corresponds to the circuits of the first car through which current is being sent.

37. In combination with an electric train, a source of alternating current, an alternating-current motor for driving the train, and a direct-current generator driven by the movement of the train and arranged to control the acceleration of the motor.

38. In combination with an electric train, a source of alternating current, a plurality of motors for driving the train, and a direct-current generator driven by the movement of the train and arranged to control the acceleration of the motors.

39. In combination with an electric train, a source of alternating current, a plurality of motors for driving the train, controllers for the motors, and a direct-current generator driven by the movement of the train and arranged to control the acceleration of the motors.

40. In combination with an electric train, an alternating-current motor for driving the train, a direct-current generator driven by the movement of the train, an electroresponsive device actuated by the direct current for controlling the acceleration of the motor.

41. In combination with an electric train, an alternating-current motor for driving the train, a direct-current generator driven by the movement of the train, an electroresponsive device comprising direct-current magnets actuated by the current from the generator for controlling the acceleration of the motor.

42. A car, an alternating-current motor for driving the car, a direct-current generator driven by the movement of the car and arranged to control the acceleration of the motor, and controlling-circuits, combined with another car having a similar motor, generator and controlling circuits, and inductive means for operatively associating the controlling-circuits on the two cars.

43. The combination of a plurality of cars each having an alternating-current motor, a direct-current generator driven by the movement of the cars and arranged to control the acceleration of the motor, and controlling-circuits, and inductive means between the cars for operatively associating their controlling-circuits.

44. The combination of a plurality of cars each having an alternating-current motor, a direct-current generator driven by the movement of the car, an electroresponsive device actuated by the current from the generator for controlling the acceleration of the motor, and controlling-circuits, and inductive means between the cars for operatively associating the controlling-circuits.

45. The combination of a plurality of cars each having an alternating-current motor, a direct-current generator driven by the movement of the car, an electroresponsive device comprising magnets actuated by the current from the generator for controlling the acceleration of the motor, and controlling-circuits, and inductive means between the cars for operatively associating the controlling-circuits.

46. The combination of a plurality of cars each having an alternating-current motor, an opposition element in the motor-circuit, a direct-current generator driven by the movement of the car, an electroresponsive device for removing the opposition element from the motor-circuit, and controlling-circuits, and inductive means between the cars for operatively associating the controlling-circuits.

47. The combination of a plurality of cars each having an alternating-current motor, an opposition element in the motor-circuit, a direct-current generator driven by the movement of the car, an electroresponsive device comprising magnets for removing the opposition element from the motor-circuit, and controlling-circuits, and inductive means between the cars for operatively associating the controlling-circuits.

48. The combination of a plurality of cars each having an alternating-current motor, an opposition element in the motor-circuit, a direct-current generator driven by the movement of the car, an electroresponsive device comprising magnets for removing the opposition element from the motor-circuit step by step, and controlling-circuits, and inductive means between the cars for operatively associating the controlling-circuits.

49. The combination of a plurality of cars each having an alternating-current motor, a direct-current generator driven by the movement of the car and arranged to generate a variable voltage in proportion to the speed of the car, an electroresponsive device connected to the generator, said electroresponsive device comprising magnets actuated one by one as the voltage increases, and controlling-circuits and inductive means between the cars for operatively associating the controlling-circuits.

50. In combination with a car, an alternating-current motor, a direct-current generator driven by the movement of the car and arranged to generate a variable voltage, an electroresponsive device connected to the generator for controlling the acceleration of the motor, said electroresponsive device comprising magnets arranged to be actuated one by one, and means for rendering the magnets inoperative.

51. In combination with a car, an alternating-current motor, a direct-current generator driven by the movement of the car and arranged to generate a variable voltage in proportion to the speed of the car, an electroresponsive device connected to the generator, for controlling the acceleration of the motor, said electroresponsive device comprising magnets arranged to be actuated one by one as the voltage increases, and means for rendering the magnets inoperative.

52. In combination with a car, an alternating-current motor, a direct-current generator driven by the movement of the car and arranged to generate a variable voltage in proportion to the speed of the car, an electroresponsive device connected to the generator, for controlling the acceleration of the motor, said electroresponsive device comprising magnets arranged to be actuated one by one as the voltage increases, and means for rendering one or more of the magnets inoperative.

53. In combination with a car, an alternating-current motor, a direct-current generator driven by the movement of the car and arranged to generate a variable voltage in proportion to the speed of the car, an electroresponsive device connected to the generator for controlling the acceleration of the motor, said electroresponsive device comprising magnets arranged to be actuated one by one as the voltage increases, and manually-operated means for rendering one or more of the magnets inoperative.

54. The combination of a plurality of cars each having an alternating-current motor, a direct-current generator driven by the movement of the car and arranged to generate a variable voltage in proportion to the speed of the car, an electroresponsive device connected to the generator, said electroresponsive device comprising magnets automatically actuated one by one as the voltage increases, means for rendering said magnets inoperative, and controlling-circuits and inductive means between the cars for operatively associating the controlling-circuits.

55. The combination of a plurality of cars each having an alternating-current motor, a direct-current generator driven by the movement of the car and arranged to generate a variable voltage in proportion to the speed of the car, an electroresponsive device connected to the generator, said electroresponsive device comprising magnets automatically actuated one by one as the voltage increases, manually-operated means for rendering one or more of the magnets inoperative, and controlling-circuits and inductive means between the cars for operatively associating the controlling-circuits.

56. In combination with a car, an alternating-current motor for driving the car, a direct-current generator driven by the movement of the car, an electroresponsive device actuated by the direct current for automatically controlling the acceleration of the motor, and manually-controlled means for controlling the speed of the motor.

57. The combination of a plurality of cars each having an alternating-current motor, a direct-current generator driven by the movement of the cars and arranged to automatically control the acceleration of the motor, and controlling-circuits, inductive means between the cars for operatively associating their controlling-circuits, and means for controlling the cars from any selected platform of the train.

58. The combination of a plurality of cars each having an alternating-current motor, a direct-current generator driven by the movement of the cars and arranged to automatically control the acceleration of the motor and controlling-circuits, inductive means between the cars for operatively associating their controlling-circuits, manually-controlled means for starting, stopping and controlling the speed of the cars, and means for controlling the cars from any selected platform of the train.

59. In combination with a plurality of cars, alternating-current motors for the cars, controlling-circuits, electrically-operated switches in the circuits said switches comprising alternating and direct current magnets, inductive means between the cars for operatively associating the operating-circuits.

60. In combination with a plurality of cars, alternating-current motors on the cars, starting-switches in the motor-circuits, single-phase controlling-circuits arranged to close the starting-switches, and inductive means between the cars for operatively associating the controlling-circuits.

61. In combination with a plurality of cars, a source of alternating-current supply, alternating-current motors on the cars, direct-current generators connected to run with the cars, starting-switches for the motors primarily closed by the alternating current and held in closed position by the direct current, and inductive means between the cars arranged to cause the starting-switches to be closed simultaneously.

62. In combination with a plurality of cars, a source of alternating-current supply, alternating-current motors on the cars, direct-current generators connected to run with the cars, starting-switches for the motors primarily closed by the alternating current and held in closed position by the direct current, inductive means between the cars arranged to cause the starting-switches to be closed simultaneously, and means for controlling the switches from a selected point.

63. In combination with a plurality of cars, alternating-current motors for driving the cars, a source of direct current controlled by the motors, electrically-operated starting-switches for the motors, electroresponsive devices actuated by the direct current for controlling the acceleration of the motors, alternating-current magnets and direct-current magnets for actuating the starting-switches, controlling-circuits and inductive means for operatively associating the controlling-circuits on the several cars.

64. In combination with a plurality of cars, alternating-current motors for driving the cars, direct-current generators connected to run with the cars, electrically-operated starting-switches for the motors, electroresponsive devices comprising accelerating-magnets actuated by the direct current for automatically controlling the acceleration of the motors, speed-controlling switches for controlling the accelerating-magnets, alternating-current magnets and direct-current magnets for actuating the starting-switches and the speed-controlling switches, controlling-circuits and inductive means for operatively associating the controlling-circuits.

65. In combination with a plurality of cars, alternating-current motors for driving the cars, direct-current generators connected to run with the cars, electrically-operated starting-switches for the motors, electroresponsive devices comprising accelerating-magnets actuated by the direct current for automatically controlling the acceleration of the motors, speed-controlling switches for controlling the accelerating-magnets, alternating-current magnets and direct-current magnets for actuating the starting-switches and the speed-controlling switches, controlling-circuits and inductive means for operatively associating the controlling-circuits, and master-switches on the cars for controlling the said starting and speed-controlling switches.

66. In an electric train, the combination of two or more motor-cars, one or more cars without motors, controlling-circuits for the motors, and inductive means between all of the cars for operatively associating the controlling-circuits.

67. In an electric train, the combination of two or more motor-cars, one or more cars without motors, controlling-circuits for the motors and inductive means between all of the cars for operatively associating the controlling-circuits, and means for controlling the motors from a selected platform of any of the motor-cars.

68. In combination with an electric train, a plurality of controlling-circuits therefor adapted to carry alternating currents, a master-switch for controlling the circuits, and a plurality of inductive devices between the cars for operatively associating the controlling-circuits.

69. In combination with an electric train, a plurality of controlling-circuits therefor adapted to carry alternating currents, a master-switch for controlling the circuits, a plurality of inductive devices between the cars for operatively associating the controlling-circuits, and means for controlling the circuits from any selected car.

70. In combination with an electric train, alternating-current motors thereon, electrically-operated controlling devices for the motors, alternating-current circuits for actuating the controlling devices, and means for inductively associating the controlling-circuits between the cars.

71. In combination with an electric train, alternating-current motors thereon, electrically-operated controlling devices for the motors, alternating-current circuits for actuating the controlling devices, means for inductively associating the controlling-circuits between the cars, and means for controlling the controlling-circuits from a selected platform of the train.

72. In combination with a plurality of cars, alternating-current motors on the cars, starting-switches in the motor-circuits, alternating-current-controlling circuits arranged to close the starting-switches, and inductive means between the cars for operatively associating the controlling-circuits.

73. In combination with two cars, an inductive apparatus comprising two parts each inclosed in a waterproof casing, one of which parts is supported by one of the cars and the other of which is supported by the other of the cars.

74. In combination with two connected cars, electrical circuits on the cars, an inductive apparatus associating the circuits on the cars, flexible conductors to the inductive apparatus and flexible supports for the inductive apparatus.

75. In combination with two connected cars, electrical circuits on the cars, a two-part inductive apparatus between the cars associating the circuits, flexible conductors connecting the circuits to the inductive apparatus, and flexible supports for the inductive apparatus connecting one part of the inductive apparatus to one of the cars and the other part to the other car and so arranged that they take all tensile strain between the parts if the cars become separated.

76. In combination with a plurality of cars, alternating-current motors for the cars, controlling-circuits therefor, electrically-actuated switches in the circuits, and alternating-current magnets and direct-current magnets, circuits for the magnets said magnets arranged to operate said switches.

77. In a train system; the combination of a motor or motors for hauling the train, and controlling-circuits therefor; inductive means for operatively associating the controlling-circuits, and means in the controlling-circuits to weaken and strengthen the current at will.

78. In combination with an electric train, a motor or motors for hauling the train, electrically-operated controlling devices for the motor or motors, circuits therefor, and inductive means connected to the cars for associating the controlling-circuits.

79. In an electric train, a motor or motors for hauling the train, electrically-operated controlling devices for the motor or motors, controlling-circuits therefor, means for regulating and means for controlling the circuits from any selected car of the train, and inductive means for associating the circuit between the controlling devices on the several cars.

80. In an electric train, a motor or motors for hauling the train, a source of electric supply conducted to the motor or motors, an electric generator driven by the train and arranged to control the acceleration of the motor or motors.

81. In combination with a plurality of cars, alternating-current motors for driving the cars, a source of direct current controlled by the motors, electrically-operated starting-switches for the motors, electroresponsive devices actuated by direct current for controlling the acceleration of the motors, alternating-current magnets and direct-current magnets arranged to actuate the starting-switches and the speed-controlling switches.

82. In combination with a plurality of cars, alternating-current motors for driving the cars, direct-current generators connected to run with the cars, electrically-operated starting-switches for the motors, electroresponsive devices comprising accelerating-magnets actuated by the direct current for automatically controlling the acceleration of the motors, speed-controlling switches for controlling the accelerating-magnets, alternating-current magnets and direct-current magnets arranged to actuate the starting-switches and the speed-controlling switches.

83. In a train system, the combination of two sources of electrical energy, one of which is conducted to the train, the other of which is on the train and is proportional in strength to the speed of the train, both of which are arranged to control the movement of the train.

84. In a train system, the combination of two sources of current-supply, one of which is pulsating and of practically constant value, the other of which is on the train and varies from zero to a maximum in proportion to the speed of the train, both of said supplies arranged to control the train.

85. In a train system, two sources of electric energy, one of which is generated by the movement of the train and is proportional in strength to the speed of the train, the other of which is conducted to the train, and a master-switch arranged to control the latter supply from a selected car of the train.

86. In a train system, two sources of current-supply, one of which is conducted to the train and is pulsating but practically constant in strength, the other of which is direct and is generated by the movement of the train and is variable from zero to a maximum, a controlling-circuit on the train, and magnetic means in the controlling-circuit for controlling the starting, reversing, acceleration and stopping of the train, and additional means on the cars to control the current in the controlling-circuits.

87. In combination with a plurality of cars, motors for driving the cars, an external source of pulsating current conducted to the cars and adapted to control and to drive the motors, controlling-switches for the motors actuated by said current, a second source of current-supply obtained from a generator mechanically connected to the running mechanism of the cars, and driven thereby when the cars are in motion, said second source of supply arranged to automatically control the acceleration of the cars and to coöperate with the first source of supply to operate the controlling-switches.

88. The combination of a plurality of cars, each having an alternating-current motor, an opposition element in the motor-circuit, an electric generator driven by the movement of the car, and electroresponsive devices comprising magnets for removing the opposition element from the motor-circuit.

89. The combination of a plurality of cars each having an alternating-current motor, an opposition element in the motor-circuit, an electric generator driven by the movement of the car, an electroresponsive device comprising magnets for removing the opposition element from the motor-circuit step by step in proportion to the speeding up of the train.

90. The combination of a plurality of cars, each having an alternating-current motor, an electric generator driven by the movement of the car and arranged to generate a variable voltage in proportion to the speed of the car, an electroresponsive device connected to the generator, said electroresponsive device comprising magnets actuated one by one as the voltage increases.

91. In a train system, a motor or motors for hauling the train, an electric generator driven by the movement of the car and arranged to generate a variable voltage, an electroresponsive device connected to the generator for controlling the acceleration of the motor, said electroresponsive device comprising magnets arranged to be actuated one by one, and means for rendering the magnets inoperative.

92. In combination with a plurality of cars, alternating-current motors for the cars, controlling-circuits therefor, alternating and direct current magnets, circuits for the magnets, electrically-actuated switches in the motor-circuits, said switches arranged to be operated by the alternating and direct current magnets.

In testimony whereof we have hereunto signed our names in the presence of two subscribing witnesses.

AUGUST SUNDH.
AXEL MAGNUSON.

Witnesses:
  HENRY E. KIRBY,
  ERNEST W. MARSHALL.